US008472366B2

(12) United States Patent
Xu et al.

(10) Patent No.: US 8,472,366 B2
(45) Date of Patent: Jun. 25, 2013

(54) NETWORK-RELAY SIGNALING FOR DOWNLINK TRANSPARENT RELAY

(75) Inventors: Hua Xu, Ottawa (CA); Jianglei Ma, Kanata (CA); Ming Jia, Ottawa (CA); Hang Zhang, Nepean (CA)

(73) Assignee: Research In Motion Limited, Waterloo, Ontario (CA)

( * ) Notice: Subject to any disclaimer, the term of this patent is extended or adjusted under 35 U.S.C. 154(b) by 436 days.

(21) Appl. No.: 12/806,218

(22) Filed: Sep. 21, 2009

(65) Prior Publication Data

US 2012/0087296 A1    Apr. 12, 2012

Related U.S. Application Data

(60) Provisional application No. 61/098,840, filed on Sep. 22, 2008.

(51) Int. Cl.
*H04B 7/14* (2006.01)
(52) U.S. Cl.
USPC .......................................... 370/315; 370/236
(58) Field of Classification Search
USPC ........................ 370/315, 236, 522
See application file for complete search history.

(56) References Cited

U.S. PATENT DOCUMENTS

| 2003/0227946 | A1  | 12/2003 | Schwarz et al. |
|---|---|---|---|
| 2004/0192204 | A1* | 9/2004 | Periyalwar et al. ............. 455/25 |
| 2005/0232183 | A1* | 10/2005 | Sartori et al. .................. 370/319 |
| 2007/0098102 | A1* | 5/2007 | Hottinen ........................ 375/260 |
| 2007/0153734 | A1  | 7/2007 | Lee et al. |
| 2008/0068979 | A1* | 3/2008 | Visotsky et al. ............... 370/208 |
| 2008/0227386 | A1* | 9/2008 | Dayal et al. ........................ 455/7 |
| 2009/0175369 | A1  | 7/2009 | Atarashi et al. |
| 2009/0233544 | A1  | 9/2009 | Oyman et al. |
| 2009/0262678 | A1  | 10/2009 | Oyman et al. |
| 2010/0034158 | A1* | 2/2010 | Meylan ......................... 370/329 |
| 2010/0278121 | A1* | 11/2010 | Chun et al. .................... 370/329 |
| 2011/0029833 | A1* | 2/2011 | Zhang et al. .................. 714/749 |
| 2011/0126071 | A1* | 5/2011 | Han et al. ...................... 714/749 |

FOREIGN PATENT DOCUMENTS

| CN | 101345568 A | 1/2009 |
|---|---|---|
| WO | WO2010017628 A1 | 2/2010 |
| WO | WO2010026287 A1 | 3/2010 |
| WO | WO2010124605 A1 | 11/2010 |

OTHER PUBLICATIONS

3GPP TSG-RAN1 Meeting #54bit (R1-083866); "More Design Aspect on Downlink Transparent Relay in LTE-A" Source: Nortel; Prague, Czech; Sep. 29-Oct. 3, 2008 pp. 1-4, sections 1 and 2.1.*
International Search Report and Written Opinion of the International Searching Authority issued in International Application No. PCT/CA2010/001508 on May 25, 2011.

(Continued)

*Primary Examiner* — Brian D Nguyen
(74) *Attorney, Agent, or Firm* — Fish & Richardson P.C.

(57) ABSTRACT

A method of providing downlink retransmissions to a mobile station in a wireless communication network, the wireless communication network comprising a base station communicatively linked to a transparent relay station, the method comprising: at the base station: receiving a request for a retransmission from the mobile station; scheduling resources for the retransmission; signalling scheduling information for the retransmission to the transparent relay station via a control link; at the transparent relay station: receiving said scheduling information for the retransmission on the control link; and sending the retransmission to the mobile station in a retransmit subframe on a retransmit frequency band.

14 Claims, 9 Drawing Sheets

OTHER PUBLICATIONS

International Preliminary Report on Patentability issued in International Authority No. PCT/CA2010/001508 on Mar. 27, 2012; 7 pages.

Nortel: "Some Further Consideration for DL transparent Relay in LTE-A" (R1-084462); 3GPP TSG-RAN1 Meeting #55; Prague, Czech Republic, Nov. 10-14, 2008; 6 pages.

Office Action issued in U.S. Appl. No. 12/887,127 on Jun. 20, 2012; 17 pages.

Office Action issued in U.S. Appl. No. 12/887,127 on Jan. 3, 2013; 17 pages.

* cited by examiner

NETWORK-RELAY SIGNALING FOR DOWNLINK TRANSPARENT RELAY

CROSS-REFERENCE TO RELATED APPLICATIONS

This application claims the benefit of priority from U.S. provisional patent application Ser. No. 61/098,840 filed Sep. 22, 2008.

TECHNICAL HELD

This application relates to wireless communication techniques in general, and to a techniques of the present disclosure, in particular.

SUMMARY

Aspects and features of the present application will become apparent to those ordinarily skilled in the art upon review of the following description of specific embodiments of the disclosure in conjunction with the accompanying drawing figures and appendices.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
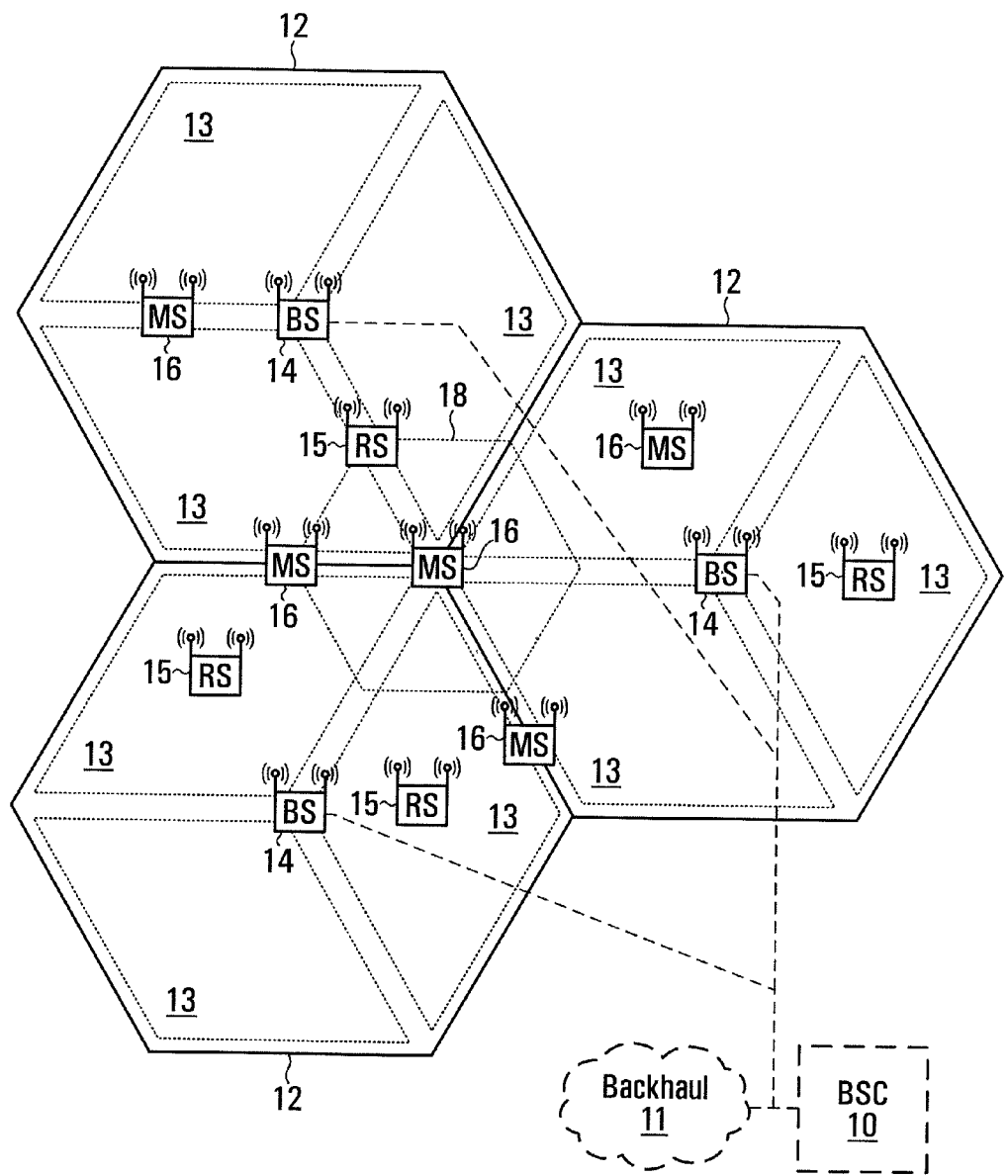
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
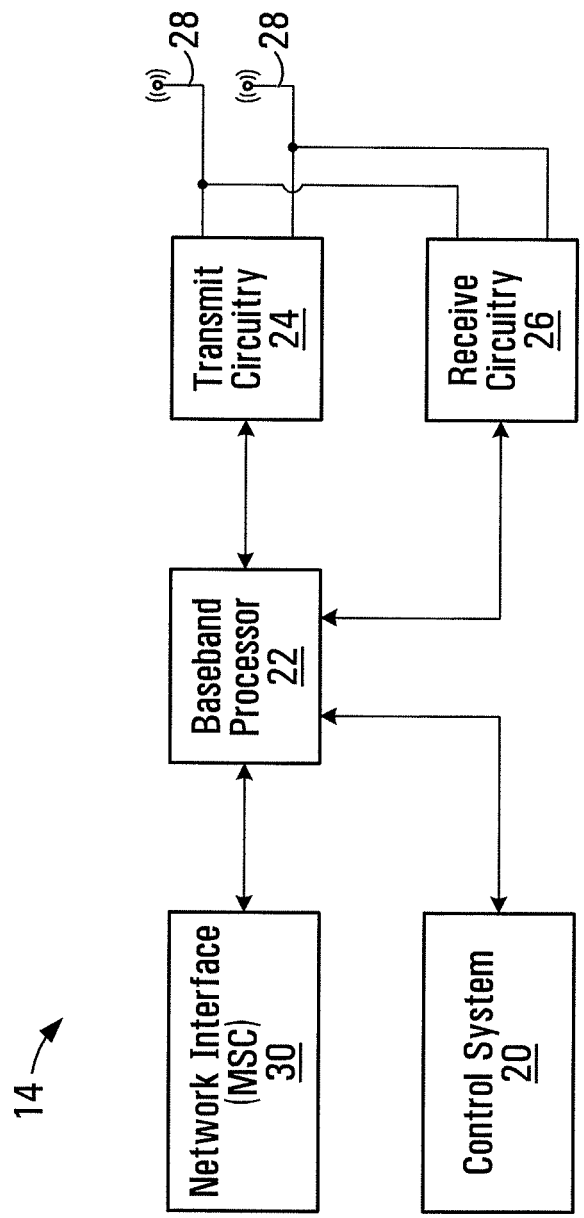
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
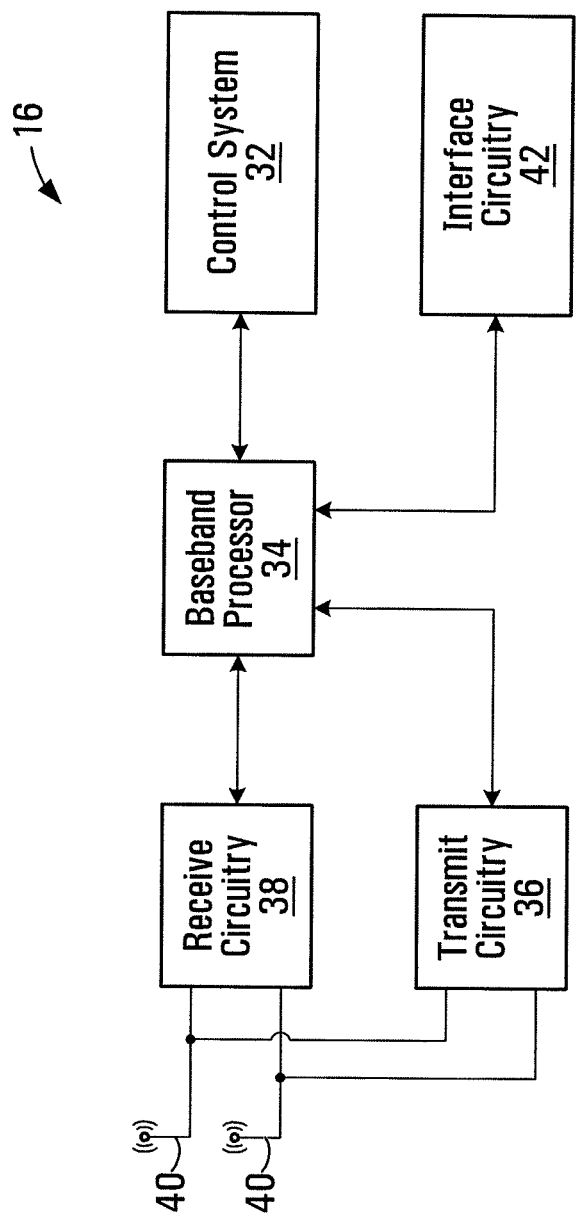
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing, Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1), Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
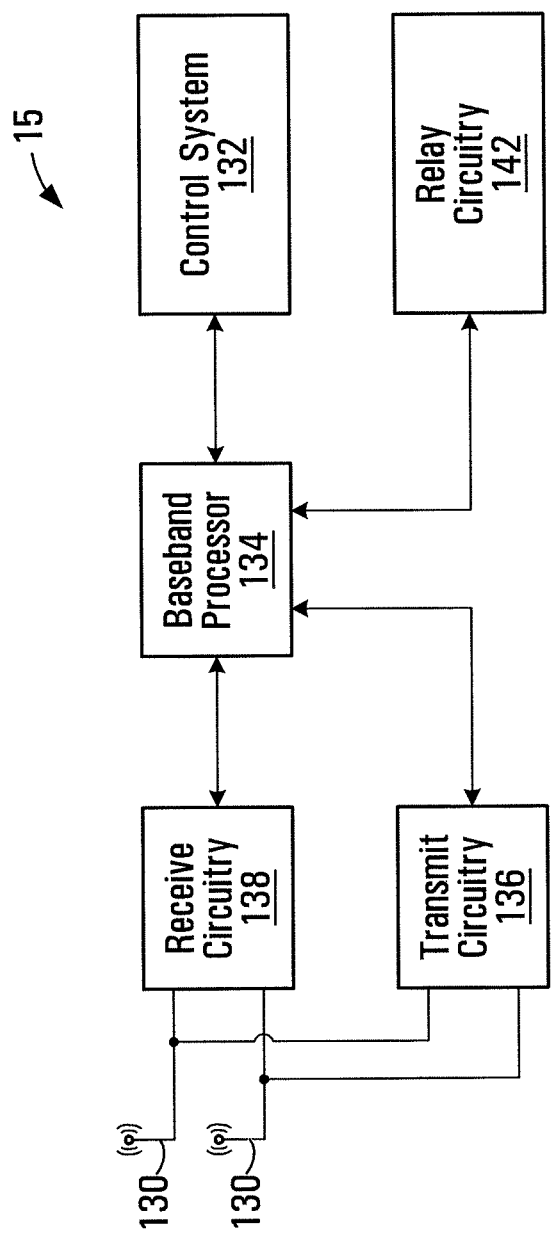
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
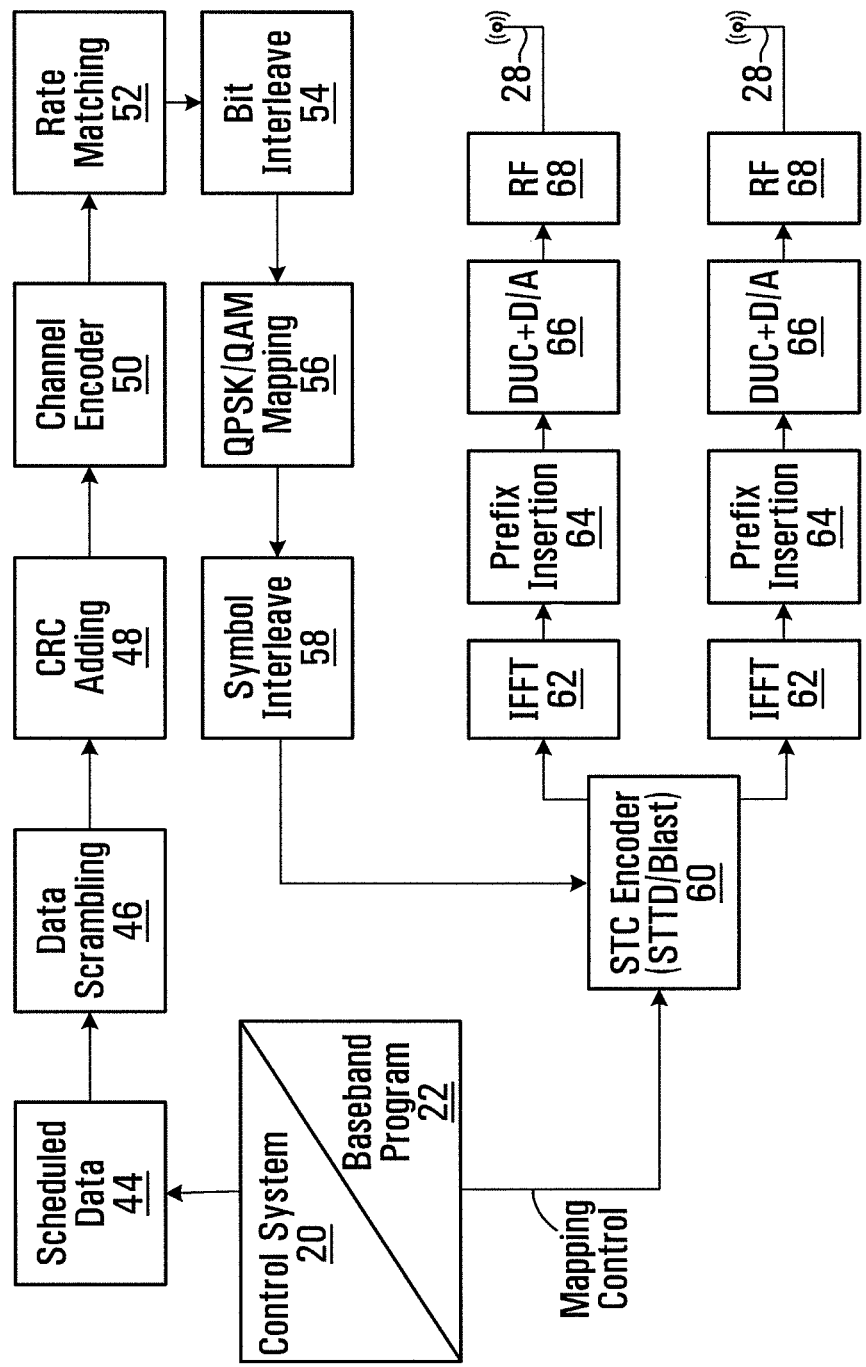
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
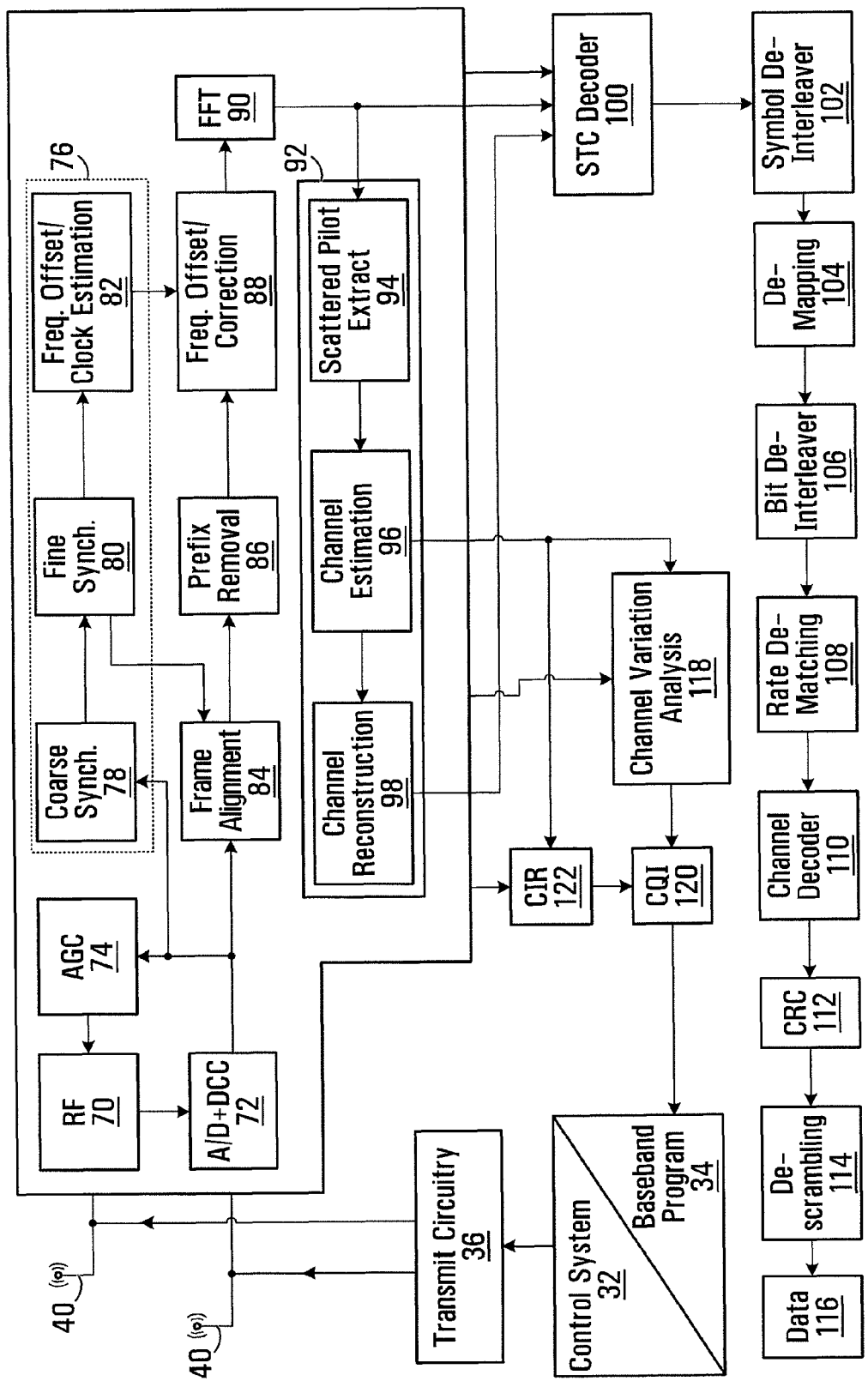
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail, Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation in between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using hit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
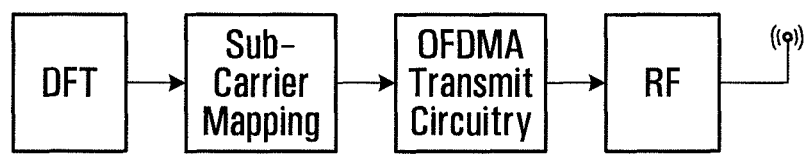
FIG. 7A and FIG. 7B are examples SC-FDMA transmitter and receiver for single-in single-out (SISO) configuration provided in accordance with one embodiment of the present application.
Figure 7B:
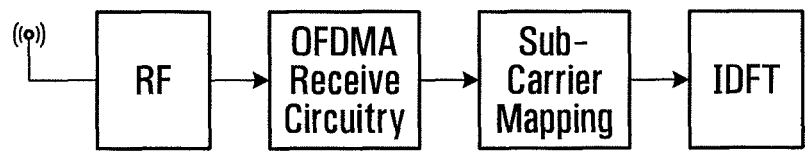
Figure 8:
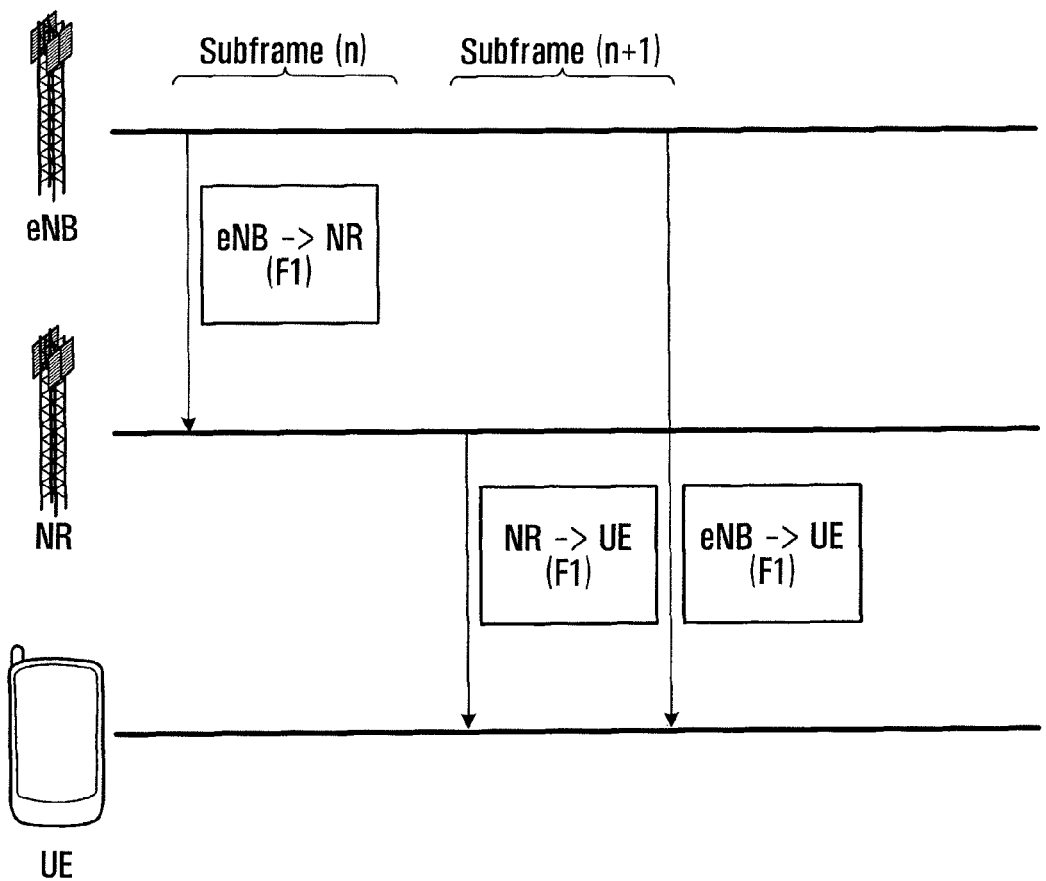
FIG. 8 shows a flow diagram illustrating the steps for a DL HARQ retransmission.
Figure 9A:
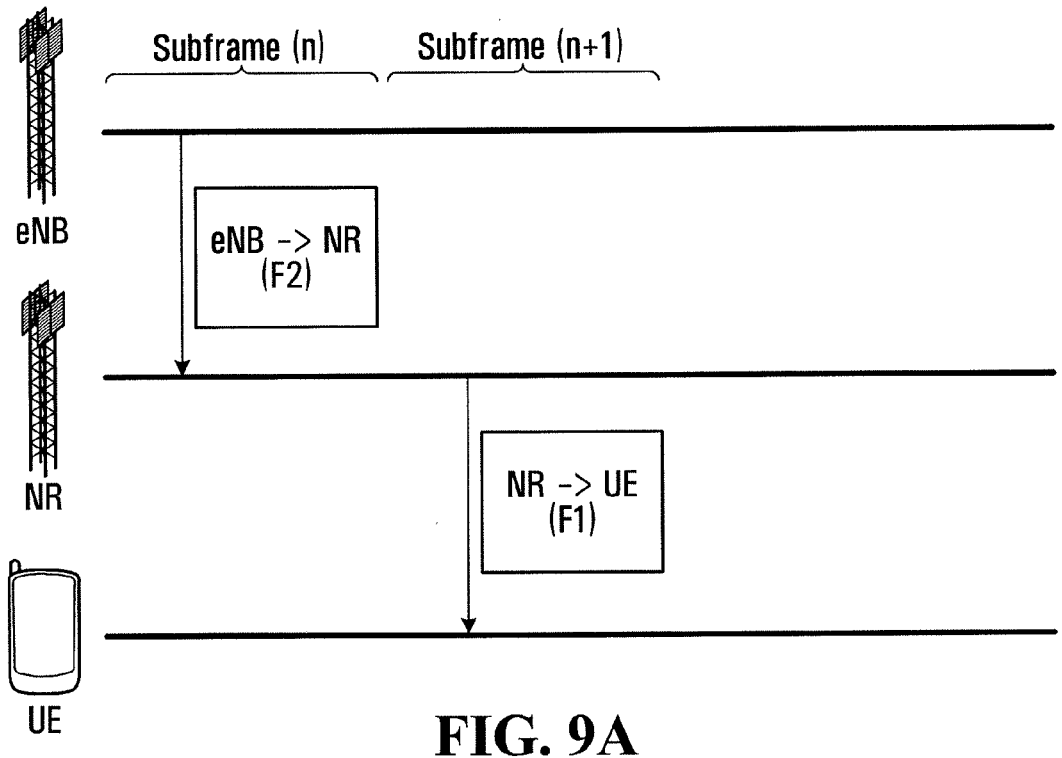
FIG. 9A illustrates another example DL HARQ retransmission scheme in accordance with embodiments of the present application.
Figure 9B:
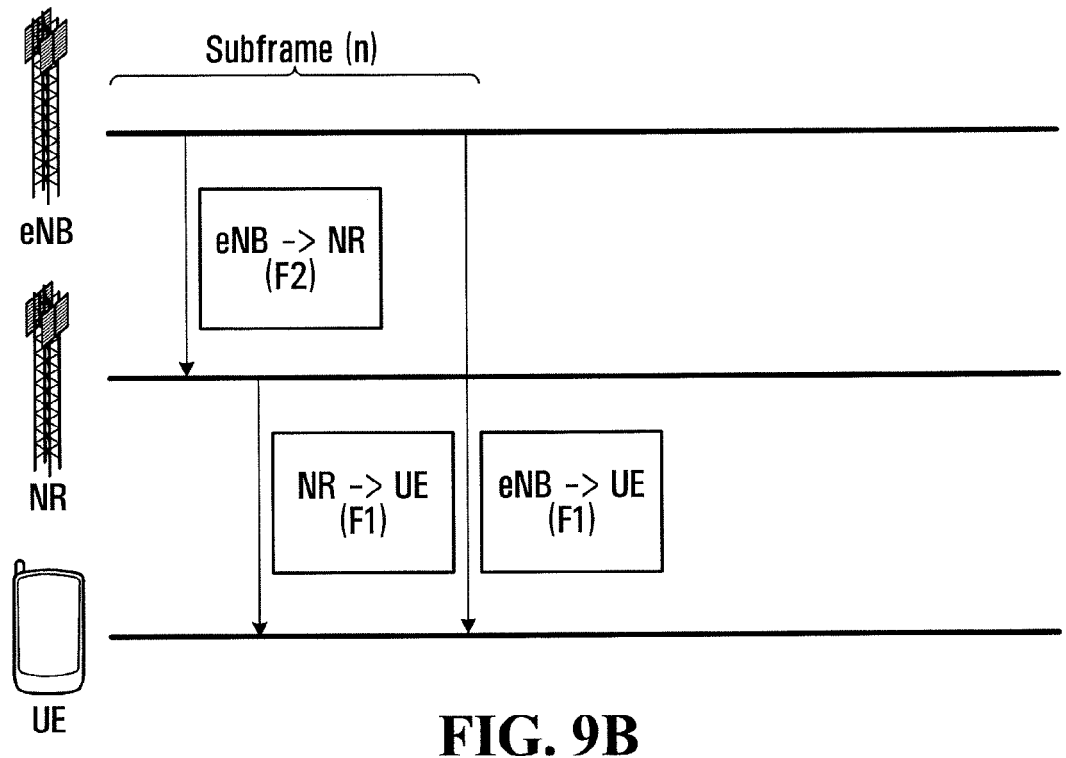
FIG. 9B illustrates yet another example DL HARQ retransmission scheme in accordance with embodiments of the present application.

Referring to FIG. 7, an example SC-FDMA transmitter 7(a) and receiver 7(b) for single-in single-out (SISO) configuration is illustrated provided in accordance with one embodiment of the present application. In SISO, mobile stations transmit on one antenna and base stations and/or relay stations receive on one antenna. FIG. 7 illustrates the basic signal processing steps needed at the transmitter and receiver for the LTE SC-FDMA uplink. In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SCFDMA signal is lower than the PAPR of OFDMA signal. Lower PAPR greatly benefits the mobile terminal in terms of transmit power efficiency.

FIGS. 1 to 9 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Introduction
  Transparent relay has been included as one relay mode in LTE-A TR.
  Transparent relay means that UE doesn't know whether or not it communicates with the network via the relay
  It is preferable for the transparent relay to support Rel-8 UE.
  Transparent relay can be used to improve the performance of LTE Rel-8
    Case-1: deploy in the Rel-8 network
    Case-2: deploy as one relay mode in LTE-A network to serve Rel-8 UE.
Issues
  In order to apply DL transparent relay to assist DL retransmission during HARQ, NR (Node of relay station) should be synchronized with eNB (base station) in time and frequency.
  The issues of the DL signaling for DL transparent relay:
    DL HARQ is asynchronous
      The retransmission information, such as MCS and channel resource allocation, is signaled through DL control channel (PDCCH) in the same subframe as the retransmission
    As the control signaling region and date transmission region are multiplexed contiguously in TDM fashion, there is no guard time between them
      The DL control channel (PDCCH) is transmitted in the first n (n=1, 2 and 3) I OFDM symbols in each subframe,
      The DL data channel (PDSCH) is transmitted through the rest (N-n) OFDM symbols (N is the number of OFDM symbols in each subframe),
      It is hard for NR to switch from reception mode to transmission mode between contiguous symbols
      It is also difficult for NR to decode re-transmission information in PDCCH and prepare retransmission on PDSCH in the same subframe.
    In some situation, the number of PDCCH carried by PCFICH could vary from subframe to subframe, this also make it hard for NR to decode PCFICH and determine the start of PDSCH and send retransmission in the same subframe
Scenario-1: In-Band DL Transparent Relay
  One solution to resolve these issues is to use network-to-relay link to signal re-transmission information of re-transmission to the NR.
  This DL network-relay link could occupy the same frequency band as network-to UE access link.
  NR receives signals from eNB and transmits signals to TIE in different subframes.
    eNB identifies cell edge UEs which needs the help of NR for re-transmission.
    eNB schedules the re-transmission information for these LTEs one subframe ahead.
      With the help of relay, the requirement on scheduler to capture the instantaneous channel variation is eased.
    eNB signals the re-transmission information through the reserved channel resource, for example, the reserved PDCCH, to NR one subframe ahead of the re-transmission
      New control channel format can be defined.
        For example PDCCH for a group of cell edge UEs.
    NR obtains re-transmission information and sends the scheduled re-transmission in the next subframe the same as eNB.
Scenario-2: Out-of-Band DL Transparent Relay
  DL network-relay link and network-UE access link occupies different frequency band.
    A dedicated frequency band is assigned for the link between eNB and NR.
  NR receives signals from eNB and transmits signals to UE in different frequency band.
    Option-1 eNB transmits the HARQ related PDCCH in subframe n and NR transmits the retransmission data to the UE in subframe (n+1);
    Option-2 eNB transmits the HARQ related PDCCH in subframe n and NR transmits the retransmission data to UE in subframe
      Different control channel format can be used for NR orientated PDCCH such that there are some guard time to allow NR to decode its PDCCH before sending the corresponding PDSCH.
Key Features
  The DL network-relay link could be used to signal re-transmission information to the NR for transparent relay.

Both intend network-relay signaling channel and outband network-relay signaling channel can be designed to signal the cell edge UE's HARQ information to NR.

For inband network-relay link, re-transmission information could be signaled to NR one subframe before its corresponding re-transmission.

For outband network-relay link, re-transmission information could be signaled to NR one subframe before or in the same subframe as its corresponding re-transmission. If in the same subframe, there should be enough guard time between reception of such control signaling and re-transmission at NR.

Different structure can be defined for network-relay link.

Inband network-relay link could use some reserved resources in PDCCH or PDSCH.

Technical Information

Brief Description of the Application:

In LTE downlink with transparent relay deployment, the node of relay station (NR) could help improving the system performance by send re-transmission signal to UE at the same time as eNB. To solve the problem that relay node (NR) doesn't know the re-transmission information ahead of time, it is proposed in this Application that a signaling is sent from eNB to NR with re-transmission information The network-relay link could be used for such signaling, which could be either in band or out band. For in band link, such signaling could be sent to the NR one sub frame ahead of the re-transmission. For out band link, such signaling could be sent to the NR one sub frame ahead of the re-transmission or in the same sub-frame as the re-transmission.

Problem Solved by the Application:

In order to apply DL transparent relay to assist DL retransmission during HARQ, NR (Node of relay station) should be synchronized with eNB (base station) in time and frequency.

The issues of the DL signaling for DL transparent relay:

DL HARQ is asynchronous

The retransmission information, such as MCS and channel resource allocation, is signaled through DL control channel (PDCCH) in the same sub frame as the retransmission As the control signaling region and date transmission region are multiplexed contiguously in TDM fashion, there is no guard time between them The DL control channel (PDCCH) is transmitted in the first n (n=1, 2 and 3)1 OFDM symbols in each sub frame.

The DL data Channel (PDSCH) is transmitted through the reset (N-n) OFDM symbols (N is the number of OFDM symbols in each sub frame), It is hard for NR to switch from reception mode to transmission mode between contiguous symbols It is also difficult for NR to decode re-transmission information in PDCCH and prepare retransmission on PDSCH in the same sub frame.

In some situation, the number of PDCCH carried by PCFICH could vary from sub frame to sub frame, this also make it hard for NR to decode PCFICH and determine the start of PDSCH and send retransmission in the same sub frame Solutions that have been Tried and why they Didn't Work:

Other solution include:

1. Schedule the re-transmission on pre-determined subframes (sync But that could apply more restriction on the scheduler.

Specific Elements or Steps That Solved the Problem and how they do it:

If network-relay signaling is in band, the following procedure could be followed:

1. eNB identifies cell edge UEs which needs the help of NR for re-transmission.
2. eNB schedules the re-transmission information for these UEs one sub frame ahead.
3. eNB signals the re-transmission information through the reserved channel resource, for example, the reserved PDCCH, to NR one sub frame ahead of the re-transmission
4. NR obtains re-transmission information and sends the scheduled re-transmission in the next sub frame the same as eNB.

If network-relay signaling is out band, re-transmission information to the relay could be sent through the separate network-relay link one sub frame ahead of re-transmission, or in the same sub frame of the re-transmission.

Commercial Value of the Application:

The Application will increase the robustness of the transparent relay system and enhance its performance. It will benefit Nortel's product if it is implemented if such transparent relay scheme is adopted by LTE-A standard, Nortel's IPR on the design of transparent relay system will be part of the standard.

The above-described and appended embodiments of the present application are intended to be examples only. Those of skill in the art may effect alterations, modifications and variations to the particular embodiments without departing from the scope of the application.

What is claimed is:

1. A method of providing downlink retransmissions to a mobile station in a wireless communication network, said wireless communication network comprising a base station communicatively linked to a transparent relay station, said method comprising:
    at said base station:
        receiving a request for a retransmission from said mobile station;
        scheduling resources for said retransmission;
        signalling scheduling information for said retransmission to said transparent relay station via a control link; and
        sending said retransmission to said mobile station in a retransmit frequency band and
    at said transparent relay station:
        receiving said scheduling information for said retransmission on said control link; and
        sending said retransmission to said mobile station in a retransmit subframe on a retransmit frequency band concurrently with the base station.

2. The method of claim 1, wherein the control link is a physical downlink control channel.

3. The method of claim 2, wherein the physical downlink control channel uses a first format, the first format different from a second format used for signalling scheduling information to a mobile station.

4. The method of claim 2, wherein the physical downlink control channel is transmitting in the first three symbols in a subframe.

5. The method of claim 1, wherein the scheduling information is signaled in a first subframe and the retransmission is sent in a second subframe, the second subframe occurring one subframe after the first subframe.

6. The method of claim 1, wherein the mobile station is a cell-edge mobile station.

7. The method of claim 1, wherein the base station is a long term evolution eNB.

8. An system for providing downlink retransmissions to a mobile station in a wireless communication network, the system comprising:
   a base station comprising a processor configured to:
      receive a request for a retransmission from said mobile station,
      schedule resources for said retransmission,
      signal scheduling information for said retransmission to a transparent relay station via a control link, and
      send said retransmission to said mobile station in a retransmit frequency band; and
   said transparent relay station in communication with the base station and comprising a processor configured to:
      receive said scheduling information for said retransmission on said control link; and
      send said retransmission to said mobile station in a retransmit subframe on a retransmit frequency band concurrently with the base station.

9. The system of claim 8, wherein the control link is a physical downlink control channel.

10. The system of claim 9, wherein the physical downlink control channel uses a first format, the first format different from a second format used for signalling scheduling information to a mobile station.

11. The system of claim 9, wherein the physical downlink control channel is transmitting in the first three symbols in a subframe.

12. The system of claim 8, wherein the scheduling information is signalled in a first subframe and the retransmission is sent in a second subframe, the second subframe occurring one subframe after the first subframe.

13. The system of claim 8, wherein the mobile station is a cell-edge mobile station.

14. The system of claim 8, wherein the base station is a long term evolution eNB.

* * * * *